United States Patent [19]

Bringol

[11] 4,240,075
[45] Dec. 16, 1980

[54] TEXT PROCESSING AND DISPLAY SYSTEM WITH MEANS FOR REARRANGING THE SPATIAL FORMAT OF A SELECTABLE SECTION OF DISPLAYED DATA

[75] Inventor: Charles R. Bringol, Austin, Tex.

[73] Assignee: International Business Machines Corporation, Armonk, N.Y.

[21] Appl. No.: 46,894

[22] Filed: Jun. 8, 1979

[51] Int. Cl.³ .............................................. G06F 3/153
[52] U.S. Cl. ................................... 340/798; 340/706; 340/724; 340/750
[58] Field of Search ............... 340/723, 748, 750, 798, 340/724

[56] References Cited

U.S. PATENT DOCUMENTS

| | | | |
|---|---|---|---|
| 3,540,012 | 11/1970 | Ehrman | 340/724 X |
| 3,603,966 | 9/1971 | Gregg et al. | 340/748 X |
| 3,618,032 | 11/1971 | Goldsberry et al. | 340/748 X |
| 3,648,245 | 3/1972 | Dodds et al. | 340/750 X |
| 3,675,208 | 7/1972 | Bard | 340/750 X |
| 3,729,714 | 4/1973 | Heard | 340/748 X |
| 3,729,730 | 4/1973 | Sevilla et al. | 340/750 |
| 3,740,743 | 6/1973 | Baron | 340/724 X |
| 3,786,429 | 1/1974 | Goldman et al. | 340/748 X |
| 3,792,462 | 2/1974 | Casey et al. | 340/748 X |
| 4,070,710 | 1/1978 | Sukonick et al. | 340/748 X |
| 4,121,228 | 10/1978 | Cowe et al. | 340/724 X |
| 4,146,879 | 3/1979 | Nicholson et al. | 340/750 X |
| 4,149,145 | 4/1979 | Hartke et al. | 340/750 X |
| 4,153,940 | 5/1979 | Grier et al. | 340/750 X |
| 4,158,837 | 6/1979 | Zahorsky | 340/798 X |

Primary Examiner—David L. Trafton
Attorney, Agent, or Firm—J. B. Kraft

[57] ABSTRACT

This text processing and display system has the capability of effectively defining and rearranging the format of any selectable section of the block or page of alphanumeric data being displayed. The system involves the combination of a display device for simultaneously displaying a block or page comprising a plurality of lines of alphanumeric characters in ordered display position, with sequentially accessible storage means for storing coded data representations of the displayed characters in a sequence of storage positions spatially corresponding to the positions of the characters in the display block. Repetitive display scanning means are provided for traversing the character display positions in successive lines on the display device together with means for sequentially accessing the data representation for each character to be displayed from the storage means in synchronization with the display scanning means, and means for applying to the display device, signals representative of a whole character to be displayed at a display position prior to the movement of the display scanning means to the next display position whereby each whole character in the display block is refreshed before the next character is refreshed.

The spatial limits for a section of stored data corresponding to the selected spatial limit of a section of alphanumeric character in the displayed block are defined by inserting coded data designating the initial character into the storage means immediately preceding the initial character data and inserting the coded data designating the final character immediately succeeding the final character data.

13 Claims, 36 Drawing Figures

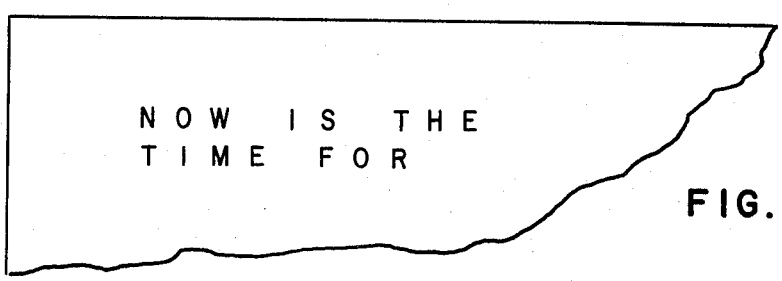
FIG. 1
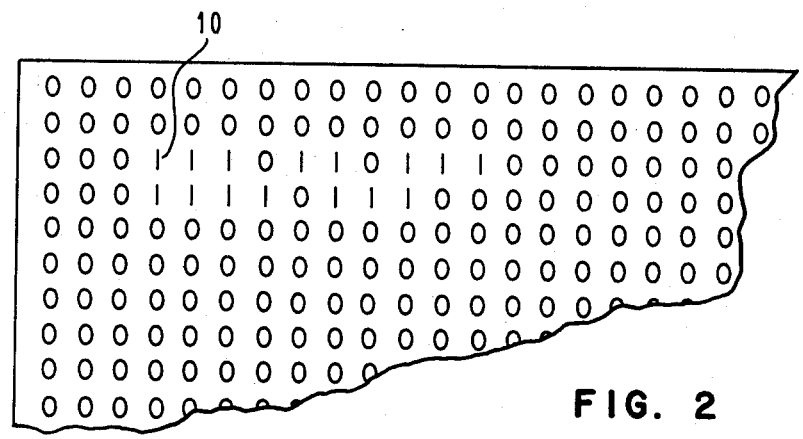
FIG. 2
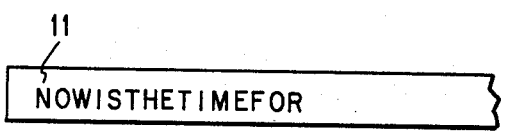
FIG. 3
(SPC203)NOW(SPC)IS(SPC)THE(SPC68)TIME(SPC)FOR
FIG. 4

NOW IS THE TIME. $2^{N}-1$

NOW BUS IS EUS THE TIME. 2 RHI N HI -1

FIG. 10

(SPC102) NOW (SPC) BUS IS EUS (SPC) THE (SPC) TIME. (SPC3) 2 RHI N HI -1

FIG. 11

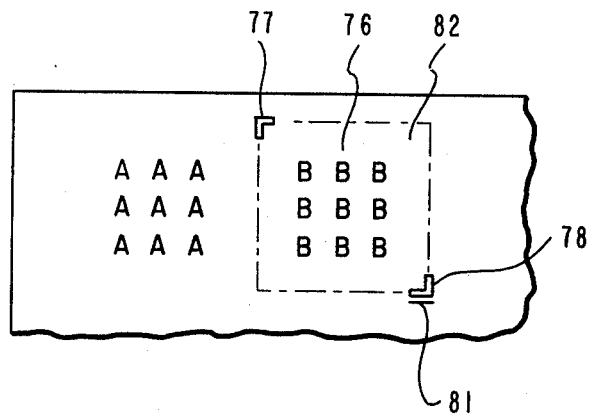
FIG. 19
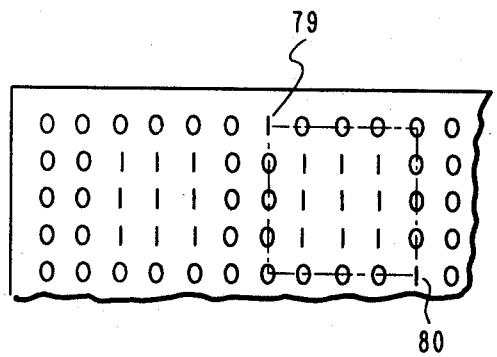
FIG. 20
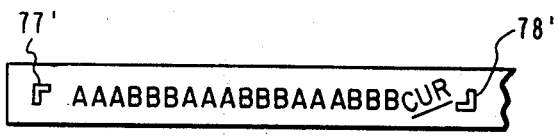
FIG. 21
FIG. 22

TEXT PROCESSING AND DISPLAY SYSTEM WITH MEANS FOR REARRANGING THE SPATIAL FORMAT OF A SELECTABLE SECTION OF DISPLAYED DATA

DESCRIPTION

BACKGROUND OF THE INVENTION

This invention relates to text processing and display systems. More particularly, it relates to text processing and display systems utilizing storage means which are sequentially accessible and store coded data representations of the displayed characters in a sequence of storage positions spatially corresponding to the positions of said characters in the block of alphanumeric material being displayed.

The preparation of modern business documents often involves typing and editing several drafts of the document before it is complete, correct, and presented in a format that is both readily understandable and aesthetically pleasing to the eye of the reader. The steps of preparing a final printed copy of a document often entail: (1) Typing a rough draft from raw data, dictation equipment, or notes; (2) deletions, insertions, rearrangement and corrections by an editor; (3) retyping, using the edited rough draft as a source of information; (4) reediting to insure correctness and to insure aesthetic perfection; (5) retyping as necessitated by step (4) reediting to insure correctness of the final copy.

As can be seen from the above, each time information is typed, it must be reread and perhaps edited to insure that it is correct, and each time that it is edited, it must be retyped. This process is extremely time consuming inasmuch as the secretary's time is lost in retyping while the editor's time is lost in reediting.

Several devices have been proposed and utilized which shorten the amount of time lost in retyping and reediting business documents. A traditional prior art approach has been to record the characters typed on a secondary medium such as a magnetic medium which is selectively utilized by the typist to control the typewriter so that it will automatically printout the information contained in the first draft together with any subsequent editing changes. In recent years this traditional approach is being replaced by text processing systems utilizing cathode ray tubes (CRT) displays or like displays which display information keyed into the text processing system of an associated input terminal such as the keyboard. The input information is displayed and corrections to the displayed data may be made by the operator. Such corrections would of course include entry of new data, deletion of existing data, or insertion of new data.

Presently available self-contained text processing systems contain the control electronics required to effect data editing in the CRT display utilizing the keyboard. These text editing systems generally have their own bulk storage wherein the characters to be displayed are stored in some convenient form. Once the information content being displayed is believed to be correct, data in the bulk storage is transmitted to a central microprocessor which then controls the printout of the information on any standard printer. While presently available text processing equipment handles the editing of letters and standard book pages which have a full paragraph sequential format, the art is interested in the development of improved systems for the effective handling of full page text material having a plurality of columns. Similarly there is a need for text processing systems which have the capability of selectively designating sections of subblocks of the displayed data and completely changing the format of the selected section of displayed alphanumeric data as well as shifting such designated sections of displayed data to another portion of a page or even to another page. In other words, there appears to be a need for effective systems for text processing involving columnar operations and/or business graphics.

While there are presently existing text processing and display systems having the capability of arranging data in a preselected form columnar format and to then affect some changes in the margins and spacing of the columns, the prior art has not provided effective text processing and display systems wherein any section of a displayed page or block of alphanumeric character may be directly defined and then that section reformatted into any configuration such as a column or listing having any desired margins and positions.

BRIEF DESCRIPTION OF THE PRESENT INVENTION

Accordingly, it is a primary object of the present invention to provide an effective text processing and display system wherein any section of a block of displayed data may be defined and reformatted.

It is another object of the present invention to provide an effective text processing and display system wherein any one or more sections of a block of displayed alphanumeric characters may be defined and reformatted into one or more columns.

It is an even further object of the present invention to provide a text processing and display system wherein any portion or section of the block of displayed alphanumeric information may be defined and then treated as a separate entity for formatting purposes, i.e., the margins of the defined section may be justified, adjusted or the section may be moved in much the same manner as would the overall block or page.

The present invention accomplishes the above objects by providing a text processing and display system which comprises a display device which simultaneously displays a block or page of a plurality of lines of alphanumeric characters in ordered display position; sequentially accessible storage means for storing coded data representations of said displayed characters in a sequence of storage positions spatially corresponding to the positions of said characters in said display blocks; repetitive display scanning means for traversing said ordered character display positions in successive lines on said display device; means for sequentially accessing the data representations for each character to be displayed from said storage means in synchronization with said display scanning means, and means for applying to said display device signals representative of the whole character to be displayed at a display position prior to the movement of said display scanning means to the next display position whereby each whole character in said displayed block is refreshed before the next character is refreshed.

The last named means for applying signals representative of the whole character to the display device prior to the movement of the scanning means so that each whole character is refreshed before the next character may be implemented with the apparatus described and claimed in my copending application entitled "Alphanumeric CRT Display System with Unitary Character Formation and Refresh", Ser. No. 046,877 filed on the same date as the present application and incorporated by this reference into the present application. The apparatus of said copending application will also be described hereinafter.

The system further includes means for defining spatial limits for a section of stored data representations corresponding to selected spatial limits for a selected section of alphanumeric characters in said display block which comprises means for inserting coded data designating the initial alphanumeric character in said selected section into said sequential storage means immediately preceding the coded data representations of said character and means for inserting the coded data designating the final alphanumeric character in said selected section into said sequential storage means immediately succeeding the coded data representation of said character. The system also includes means for changing the spatial arrangement of the displayed section of characters by changing the spatial arrangement of the coded data representations of said characters in the sequential storage means between the data designating said initial and said final positions.

In order to implement the invention described above, the present invention provides a structure for sequentially accessible storage means for storing coded data representations of said displayed characters in a sequence of storage positions spatially corresponding to the positions of said characters in the displayed block which comprises matrix storage means for storing data only representative of the positions of the displayed characters in successive lines of ordered storage locations spatially corresponding to the positions of said characters of said display in combination with the sequentially accessible storage means for storing the coded data representations of said displayed characters in the same sequence as said order storage location of said positional data in said matrix storage means for said respective character. The means for sequentially accessing the data representations for each character to be displayed comprise means for scanning the ordered storage locations in the matrix storage means in synchronization with the display scanning and means for accessing the data representations for said characters being displayed when said matrix scanning means senses a stored character position.

BRIEF DESCRIPTION OF THE DRAWINGS

Referring now to the drawings, wherein a preferred embodiment of the invention is illustrated, and wherein like reference numerals are used throughout to designate like parts;

FIG. 1 is a diagrammatic illustration of alphanumeric information on a CRT display.

FIG. 2 is a diagrammatic illustration of matrix storage means associated with the CRT storing positional data corresponding to the position of the displayed alphanumeric characters of FIG. 1.

FIG. 3 is a diagrammatic illustration of the sequentially accessible storage means associated with the matrix storage means for storing the coded data representation of the displayed characters in sequence.

FIG. 4 is a diagrammatic illustration of sequentially accessible storage means which may be used alternatively to the combination of storage means of FIGS. 2 and 3 for the storage of coded data representation of the displayed character in a sequence of storage positions spatially corresponding to the positions of the character in the display block of FIG. 1.

FIGS. 8-11 are diagrammatic illustrations respectively corresponding to the diagrammatic illustrations of FIGS. 1-4 except that attributes related to the coded characters are also shown as stored in the sequentially accessible memories of FIGS. 10 and 11.

FIGS. 18, 22, 26, and 30 illustrate generalized single storage organization for both spatial and character data.

FIG. 19 is a diagrammatic illustration of alphanumeric information on a CRT display during a second stage in a text processing operation wherein the format of a column is to be changed.

FIG. 20 is a diagrammatic illustration of matrix storage means associated with a CRT storing positional data corresponding to the position of the displayed alphanumeric character of FIG. 19.

FIG. 21 is a diagrammatic illustration of the sequentially accessible storage means associated with the matrix storage means of FIG. 20 for storing coded data representations of the displayed characters in sequence at said second stage.

DESCRIPTION OF THE PREFERRED EMBODIMENTS

Figure 5:
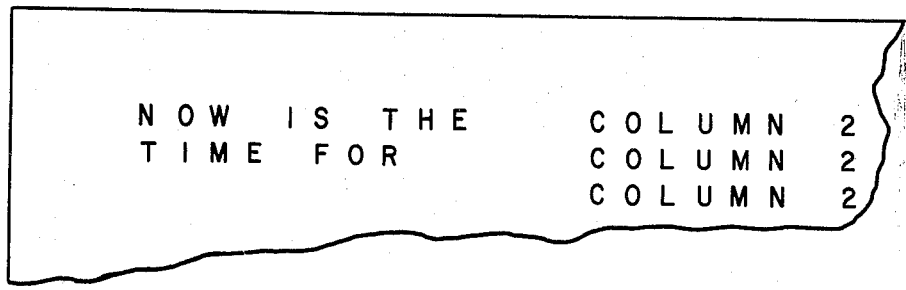
FIG. 5 is a diagrammatic illustration of alphanumeric characters arranged in columns on a CRT display.

In the practice of the present invention, a memory organization should be utilized which provides sequentially accessible storage means for storing coded data representations of a block or page of alphanumeric characters displayed on a CRT; in the sequentially accessible storage means, the coded data representations of the respective displayed characters must be in a sequence of storage positions spatially corresponding to the positions of the characters in the block or page being displayed. With respect to FIGS. 1, 2, 3 and 4, there will be described both a generalized and particular embodiment for implementing the organization of the sequentially accessible storage means in accordance with the present invention. FIG. 1 shows a part of a CRT on which a part of a page of alphanumeric data is being displayed. FIG. 4 illustrates a generalized storage organization providing sequentially accessible storage means for storing the coded data representation of the characters displayed in the CRT of FIG. 1 in a sequence of storage positions spatially corresponding to the positions of said characters in the displayed block in the CRT of FIG. 1. For purposes of illustration, let us assume that the character "N" on the CRT of FIG. 1 is in the fourth position of the third line and that each line on the display has 100 character positions. For such a case, the designation "spc (203)" in the sequentially accessible storage means of FIG. 4 means proceed for 203 spaces, i.e., two lines of 100 spaces each plus three spaces at which point the coded data representation for the character "N" will be sequenced which, in turn, utilizing the system to be hereinafter described in detail, will apply to the display device signals representative of the character "N" in synchronization with the scanning means for the CRT reaching the position for the character "N" on the CRT so that the character "N" is then refreshed. This is next followed by accessing the coded data representations of the characters "O" and "W"; respectively, FIG. 4 and the refreshing of these characters in synchronization with the scanning of the CRT.

In accordance with a more particular embodiment of the present invention as illustrated in FIGS. 2 and 3, the memory organization providing the sequentially accessible storage means for storing the coded data representations of the displayed characters is divided into two coacting memory units: a matrix storage means which stores data only representative of the positions of the displayed characters as shown in FIG. 2 wherein the positions of the "1" bits spatially correspond to the positions of the respective alphanumeric characters being displayed in the CRT of FIG. 1. In operation, as will be hereinafter described in greater detail, the positional memory matrix of FIG. 2 is accessed in synchronization with a repetitive scanning of the CRT to refresh the displayed character, e.g., when the CRT reaches the character "N", bit 10 is accessed in the memory matrix of FIG. 2; this in turn results in the accessing of the coded data representation 11 for the character "N" from the storage means shown in FIG. 3 in which the coded representations of the displayed characters are stored in the same sequence as the positional storage locations in FIG. 2 and consequently in the same sequence as the characters scanned on the display of FIG. 1. Of course, in the sequentially accessible memory of FIG. 3, there is no positional information which is provided solely by the positional matrix FIG. 2 which coacts with the storage means illustrated in FIG. 3 as will be hereinafter described.

Columnar Data

Figure 6:
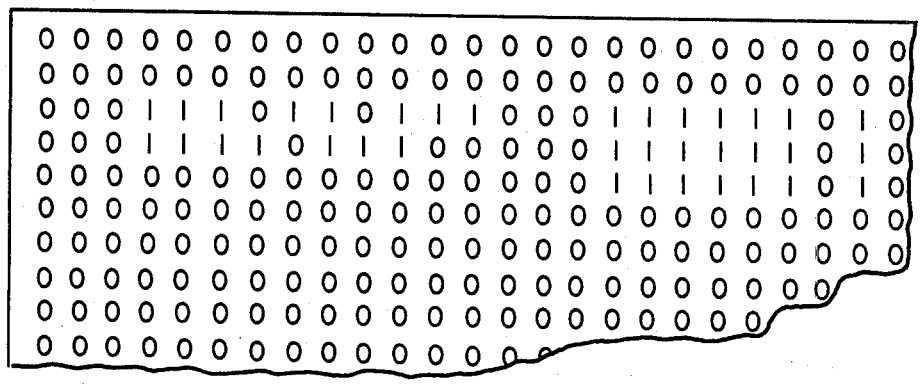
FIG. 6 is a diagrammatic illustration of matrix storage means associated with a CRT storing positional data corresponding to the positions of the displayed alphanumeric characters of FIG. 5.
Figure 7:
FIG. 7 is a diagrammatic illustration of the sequentially accessible storage means associated with the matrix storage means for storing the coded data representations of the displayed characters in sequence.

The spatial correspondent of the coded data representation of alphanumeric characters in the memory with the actual alphanumeric characters being displayed on the CRT is illustrated in FIGS. 5, 6, and 7 for a case where the alphanumeric material being displayed has a columnar arrangement. Utilizing the specific embodiment of the present invention, the positional information stored in the matrix shown in FIG. 6 directly corresponds to the columnar arrangement of the alphanumeric data in FIG. 5. Accordingly, using the circuit hardware which will be hereinafter described, the positional "1" bits are accessed out of the storage matrix, FIG. 6 in synchronization with the scanning of the CRT display of FIG. 5. Consequently, the coded data representation of the alphanumeric characters being displayed will be accessed from a sequential memory, FIG. 7, line by line traversing the whole line instead of column by column, i.e., as in prior art accessing systems wherein the coded data representations for all of the lines in the first column are accessed before accessing the coded data representation of the lines in the second column.

Character Attributes

With respect to FIGS. 8–11, some illustrations will be given of how the present system handles character attributes such as underscoring or the raising of a character above or below the character line. In the CRT of FIG. 8, the displayed alphanumeric data contains underscoring under the word "is" and a raised exponential "N" associated with the digit "2". Where the combination of positional matrix, FIG. 9, and sequentially accessible storage means for the coded data representations of the characters, FIG. 10, are used, information concerning attributes of characters is stored only in association with the coded data which is sequentially accessed, FIG. 10. For example, for underscoring the word "is", a begin underscore code (BUS) is stored before the word "is" and an end underscore code (EUS) is stored after the word "is". For the raised "N" the code reverse half index (RHI) is used before "N" and a code half index (HI) is used after the "N" to reindex into the character line.

On the other hand, as shown in FIG. 11 where the spatial information as well as the coded data representation for the characters is stored in a single sequentially accessible storage means, then the coded data representing the various character attributes, e.g., BUS, EUS, RHI, or HI are stored similarly associated with the coded representations of the characters being displayed.

General Description of CRT Control Logic

Before proceeding with any description of text processing operation wherein sections of pages or blocks are defined and then treated as separate entities for formatting purposes, the control logic for the display system should now be described. As previously indicated, for effective results the system should utilize a CRT scanning system wherein during the repetitive refresh cycle for the displayed alphanumeric information, the whole character being displayed is refreshed before the scanning means move on to the next character and refresh it and so on. In order to implement this approach, apparatus is provided for applying to the display device, i.e., CRT, signals representative of the whole character to be displayed at a particular display position prior to the movement of the display scanning means to the next display position. A unique implementation of this approach is described and claimed in the above-mentioned copending application entitled "Alphanumeric CRT Display System with Unitary Character Formation and Refresh", Ser. No. 046,877. The logic and hardware covered in said copending application will now be described as applied to the present system.

Figure 31:
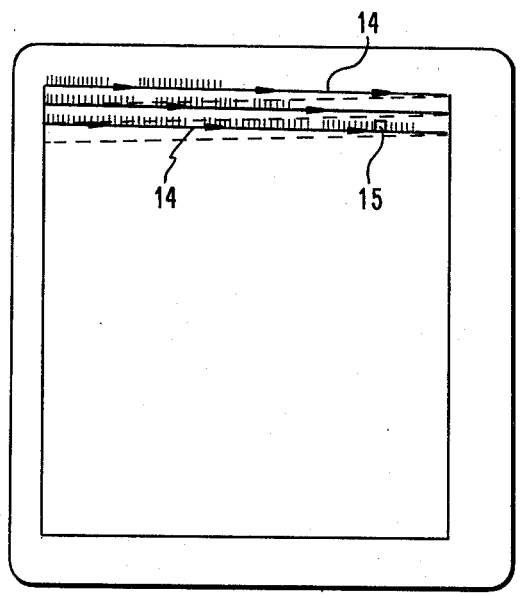
FIG. 31 is a diagram illustrating the direction of the scanning electron beam as it traverses the CRT when utilizing the micro-scanning approach used in implementing the display of the present invention.
Figure 32:
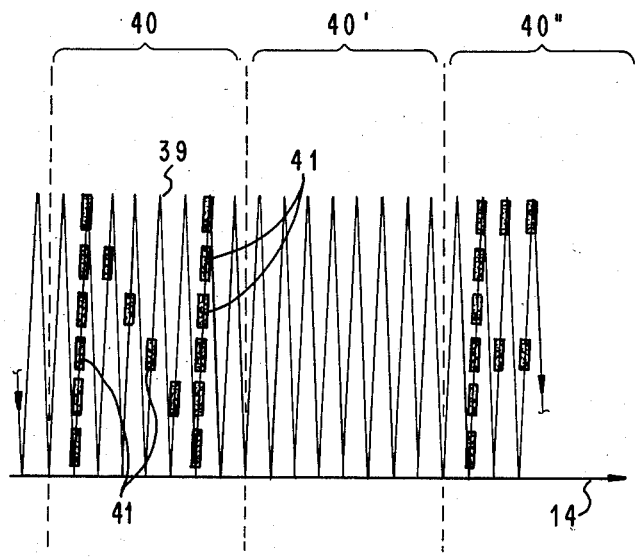
FIG. 32 is an enlarged diagram of a character position area 15, FIG. 31, to illustrate the micro-scan implementation of the present invention in the display of characters.
Figure 34A:
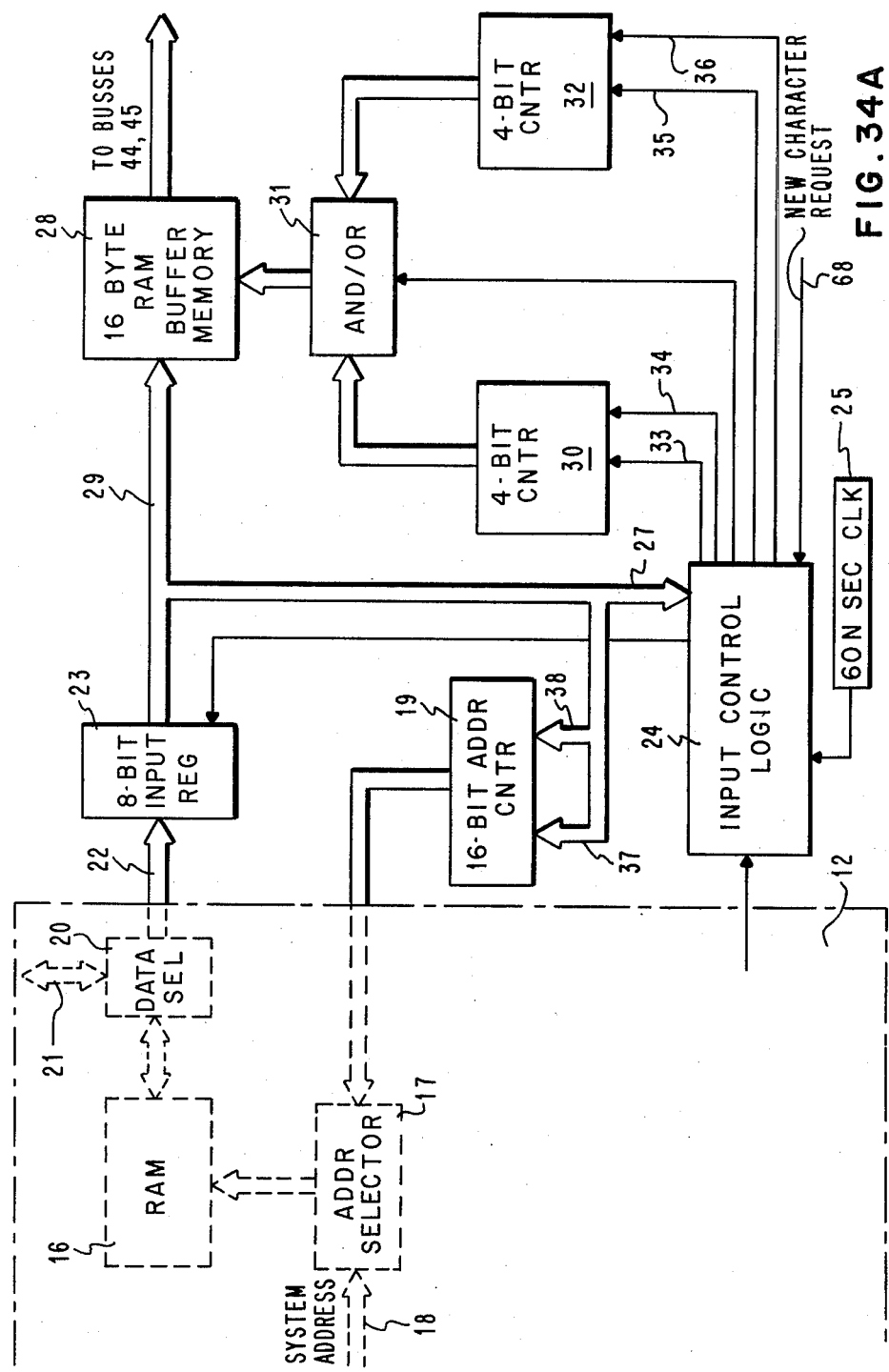
FIGS. 34A and 34B are logic diagrams showing the control logic for a CRT micro-scan display which may be used in the implementation of that embodiment of the present invention in which the character positional information and the coded character information required to generate the characters are respectively stored in two separate storage means.
Figure 34B:
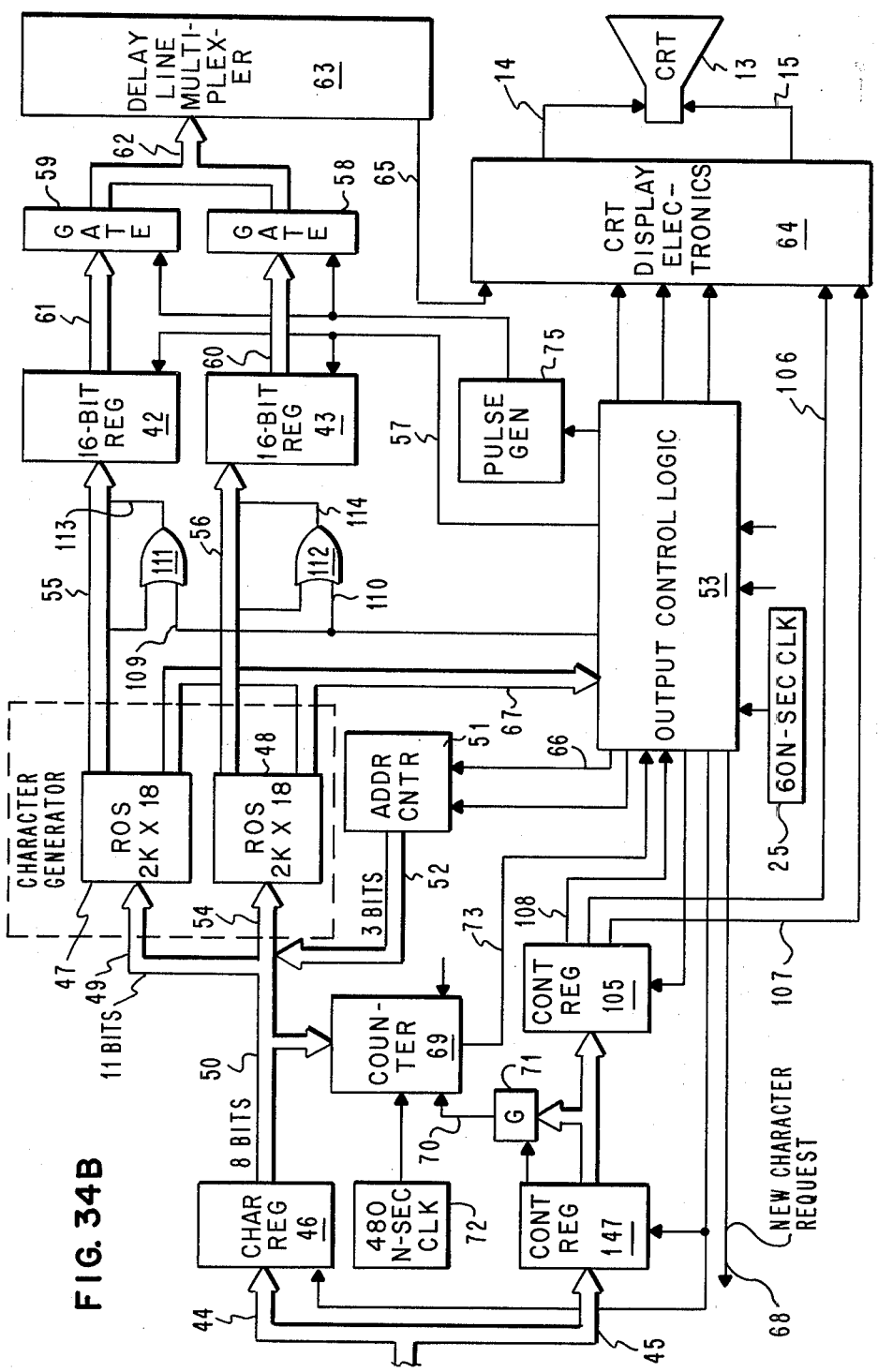

The control logic is shown in FIGS. 34A and 34B. The system is controlled by any conventional microprocessor 12 which will provide the requisite data to be hereinafter described. The ultimate signals controlling the main deflection of the beam of CRT 13 is applied via lines 14 and 15 to control the main X-axis and Y-axis deflection yokes of the CRT. The logic shown in FIGS. 34A and 34B will cause the scanning electron beam of the CRT to move from the left to right as diagrammatically shown in FIG. 31. In FIG. 31 each line 14 of the main deflection path corresponds to a line containing a plurality of character positions and forming a part of an overall displayed page. In addition, as will be described, signals at a higher frequency rate are applied to micro deflection means in order to generate a micro-raster under the control of the signals provided by the logic in FIGS. 34A and 34B; this micro-raster scan which provides the particular character is shown in FIG. 32 to produce the displayed character "N". The "N" is produced by the video which is controlled from a character generator in synchronization with the micro-raster to produce the character. In other words, when a particular main deflection scan line 14 reaches a character position 15, a character such as illustrated in FIG. 32 will be completely generated before the main line scan 14 reaches the next character position.

Control Logic for Sequentially Accessing and Displaying Characters

With reference to FIGS. 34A and 34B, the alphanumeric data to be displayed on the CRT 13 is stored in random access memory (RAM) 16 in the microprocessor 12 which controls the text processing system. In the present embodiment RAM 16 contains the coded data representations of a block or page of alphanumeric characters to be displayed on the CRT 13 in a sequence of storage positions spatially corresponding to the positions of the characters in the page or block to be displayed on the CRT. RAM 16 also contains control codes determining character positions as well as characteristics of the displayed characters such as underscore. During the main deflection along a line 14 in the CRT scan shown in FIG. 31, address selector 17, FIG. 34A, will request a signal from address counter 19 which is indicative of the position of the scanning beam along main deflection line 14, FIG. 31. Address counter 19 under the control of input control logic 24 controls the sequencing of character data from RAM 16 so that a sequence of character data is provided to the character generation means to be hereinafter described in a sequence spatially corresponding to CRT 13 display. The purpose of address selector 17, FIG. 34A, is to multiplex positional signals from address counter 19 with all other addresses being fed to RAM 16 along microprocess system buss 18 or other unrelated microprocessor functions. Systems data select means 20 perform a similar multiplexing function with respect to data being removed from the microprocessor RAM, i.e., data relating to other unrelated functions of the microprocessor system is output via systems data buss 21 while the bit of data which is indicative of the character to be displayed at the position indicated by counter 19 on CRT 13 is output along buss 22 to input register 23 while address counter 19 is incremented by one. The input control logic 24 which operates under a 60 nano-second high frequency clock 25 examines the byte of data in register 23 via buss 27 in order to determine whether the byte is an instruction code, control code or character code. For example, an instruction code would be: "LOAD ADDRESS COUNTER 19 WITH NEXT TWO BYTES". In such a case, control logic 24 will direct the next two bytes into counter 19 via busses 37 and 38. On the other hand, if it is determined that the byte in register 23 is a control code, it is passed through buss 29 to RAM buffer memory 28. By definition of the system, a character code bit will follow a control code. Thus, everytime a control code byte is sensed and loaded into buffer 28, the next byte which must be a character code byte is taken from the RAM and loaded into buffer 28 which can store up to 8 bytes of control code and 8 bytes of character code.

The 16 byte buffer memory 28 is of particular value in display systems wherein the spacing allotted to the characters is variable dependent upon the width of the character. For example, the "W" may occupy almost twice as much space as an "I". Thus, it is conceivable that during a particular scan of the CRT traversing a whole line, up to 20% more characters may be packed into a particular line if it contains many narrow characters than in another line containing primarily wider characters. Since the CRT scan is constant, i.e., the time for the main deflection to traverse a line 14 is constant, it follows that in a line having up to 20% more characters, considerably more data handling associated with character generation has to be accomplished in a same period of time as the data handling for a line containing less characters. The 16 byte buffer memory 28 provides a storage reservoir of character and control code data which may then be input to the character generation means of the present system in synchronization with the main deflection along scan line 14 of FIG. 31.

The buffer memory 28 is under the control of counter 30 which serves as the input pointer to positions in buffer memory 28 through gate 31 and counter 32 which serves as the output pointer to positions in buffer memory 28 through gate 31. Input and output counters 30 and 32 are controlled by input logic control means 24 respectively through clock 33 and clear 34 lines to counter 30 and clock 35 and clear 36 lines to counter 32.

With buffer memory loaded, the apparatus is at a stage from which the alphanumeric character to be displayed along a given display line may be refreshed in synchronization with the CRT scanning means. Before going into the description of how the characters are generated in synchronization with the scanning of the CRT, the CRT scanning cycle will be briefly described with reference to FIGS. 31 and 32. The video is controlled by the character generator in synchronization with a scan which involves a main deflection horizontal scan along lines 14 of FIG. 31 together with a microraster vertical scan as shown in FIG. 32. In other words, as the beam traverses horizontally along line 14, it is being rastered vertically along line 39 as shown in detail in FIG. 32. For purposes of illustration, we will consider the scan format in FIGS. 31 and 32 for characters of fixed proportions, i.e., the same size character box is allotted irrespective of the width of the character. In the illustration of FIG. 32, the timing relationship of the horizontal escapement unit versus the vertical scan lines in the micro-raster is such that the beam is deflected so that 8 vertical scan lines at 300 nano-seconds per scan line is the equivalent of 5 escapement units at 480 nano-seconds per escapement unit. In other words, each character box 40, 40' or 40'' is 5 escapement units wide and the vertical scan 39 is divided into 8 scan lines. As will be explained hereinafter in detail, it is during this vertical scan in a particular character box that the character generator by selectively turning on the desired combination of video line units 41 will cause the alphanumeric character to be displayed and cyclically refreshed. In the example shown in FIG. 32, the letter "N" is "painted" in character box 40 while character box 40' is a blank, i.e., no video line units are turned on, and character box 40'' contains a portion of the alphanumeric character "F".

Getting back to the stage in FIGS. 34A and 34B at which buffer memory 28 is loaded with the character code and control code bytes of the characters to be displayed, there will now be described the generation of alphanumeric characters on the display in synchronization with the scanning of the CRT. Immediately after the loading of scan line register 42 and 43 with data which represents that portion of the last previous character being displayed along the last two (seventh and eighth) scan lines in the character box for said character, the control code and the character code for the next character are respectively loaded from the buffer memory through busses 44 and 45 into character register 46 and control register 147. Using the time sequence previously described, this will permit about 600 nanoseconds for the retrieval from read only store memories (ROS) 47 and 48 in the character generator of the video pattern along the next two scan lines which will be the first two scan lines in the next character. At this point let us assume that the character and control data which have been loaded respectively into registers 46 and 147 represents a normal character to be displayed without any control code changes. The address to read only stores 47 and 48 will comprise 11 bits applied through busses 54 and 49. These 11 bits comprise 8 bits from the character register 46 output along buss 50 and 3 bits from address counter 51 output along buss 52. Under the control of the output control logic 53 which controls the character generation operation in much the same manner as input control logic 24 controls the routing of character control and instruction data from the processor RAM, the first two scan lines of the selected character pattern are respectively output from read only stores 47 and 48 along busses 55 and 56 to scan registers 42 and 43 which have been enabled for loading by a signal from output control logic 53 along line 57. Scan line register 42 will store data indicative of the turned-on video line unit pattern in the first scan line of the pair while scan register 43 will store data indicative of the pattern of turned-on video units in the second scan line.

In order to turn-on selectively the units in a given scan line in accordance with the data stored in either scan line register 42 or 43, pulse generator 75 under the control of output control logic 53 provides a gating pulse respectively to either gate 58 associated with scan register 43 or gate 59 associated with scan register 42. In this manner pulse generator will enable gate 58 for example, every 15 nano-seconds to pass data from scan line register 43 input along buss 60 or will enable gate 59 to pass data from scan line register 42 input along buss 61. Thus, as a particular scan line is being traversed, data representative of whether a video-unit is to be turned-on will be transmitted through buss 62 and delay line multiplexer 63 which provides the requisite interface delays to standard CRT display electronics 64 along line 65 whereby the appropriate video pattern will appear on the scan CRT 13. Upon the completion of the first two scan lines of a given character box, output control logic 53 increments address counter 51 with an appropriate signal along line 66 to change the three bit input from address counter 51 along buss 52 and thereby cause read only stores 47 and 48 of the character generator to respectively output the next two scan lines for the character box being scanned whereupon the above procedure is repeated, after which the address for the next two scan lines in the character box is similarly obtained and so on until all of the eight scan lines upon which the character is to be "painted" are output. The completion of a character will be indicated by a signal along buss 67 from either read only stores 47 or 48 of the character register whereupon output control logic issues a new character request along line 68 to input control logic 24, and input control logic 24 will initiate the previously described procedure for obtaining the next character from microprocessor RAM 16.

Control Logic for Spatially Positioning Displayed Characters

The control logic of FIGS. 34A and 34B has means for spatially positioning characters stored in a memory such as that of FIG. 4 in which the spatial information is stored in sequence with the sequentially accessible characters. Suppose we have a spacing operation which will be indicated by a space code, i.e., spc (0–255); the value within the parenthesis indicates the number of spaces. In such a case with reference to FIGS. 34A and 34B, suppose we have an indication of spc (150), then the first input from the processor RAM 16 to input register 28 will be the control code indicating a space operation. In such a case, control logic 24 which has examined the data in register 23 via buss 27 makes the determination that we have a space control code. Then, under the direction of input control register 24, the next byte of data which will indicate the number 150 will be passed through buffer memory 28 along with the space control code and will not be loaded into character register 46 but rather will be passed through to space counter 69 which has been enabled through gate 71 and line 70 by the space control code in control register 147. Counter 69 is then decremented by 480 nano-second clock 72 (the escapement speed). As long as there is a count remaining in counter 69, a signal is applied via line 73 to output control logic 53 which in turn will inhibit the regular pulsing of pulse generator 75. Thus, there are no signals from pulse generator 75 to enable gates 58 and 59; and the scan lines remain blank, i.e., no characters are displayed. When counter 69 zeros out, a zero signal is applied via line 73 to output control logic 53 and pulsing by the pulse generator 75 is resumed to thereby permit the "painting" or display of the next sequential character at the position which has been tabbed to.

With respect to FIGS. 33A and 33B, there will now be described a more specific embodiment of the present invention wherein the memory organization providing the sequentially accessible storage means for storing the coded data representations of the displayed characters is divided into two memory units: a matrix storing means which stores only data representative of the positions of the displayed characters as shown in FIG. 2 wherein the positions of the "1" bits spatially correspond to the positions of the respective alphanumeric characters being displayed in the CRT and a second storage means as shown in FIG. 3 in which the coded representations of the displayed characters are stored in the same sequence as the positional storage locations in FIG. 2 and consequently in the same sequence as the characters being scanned on the display. In the sequentially accessible memory illustrated in FIG. 3, there is no positional information; this is provided solely by the positional matrix of FIG. 2.

Figure 33A:
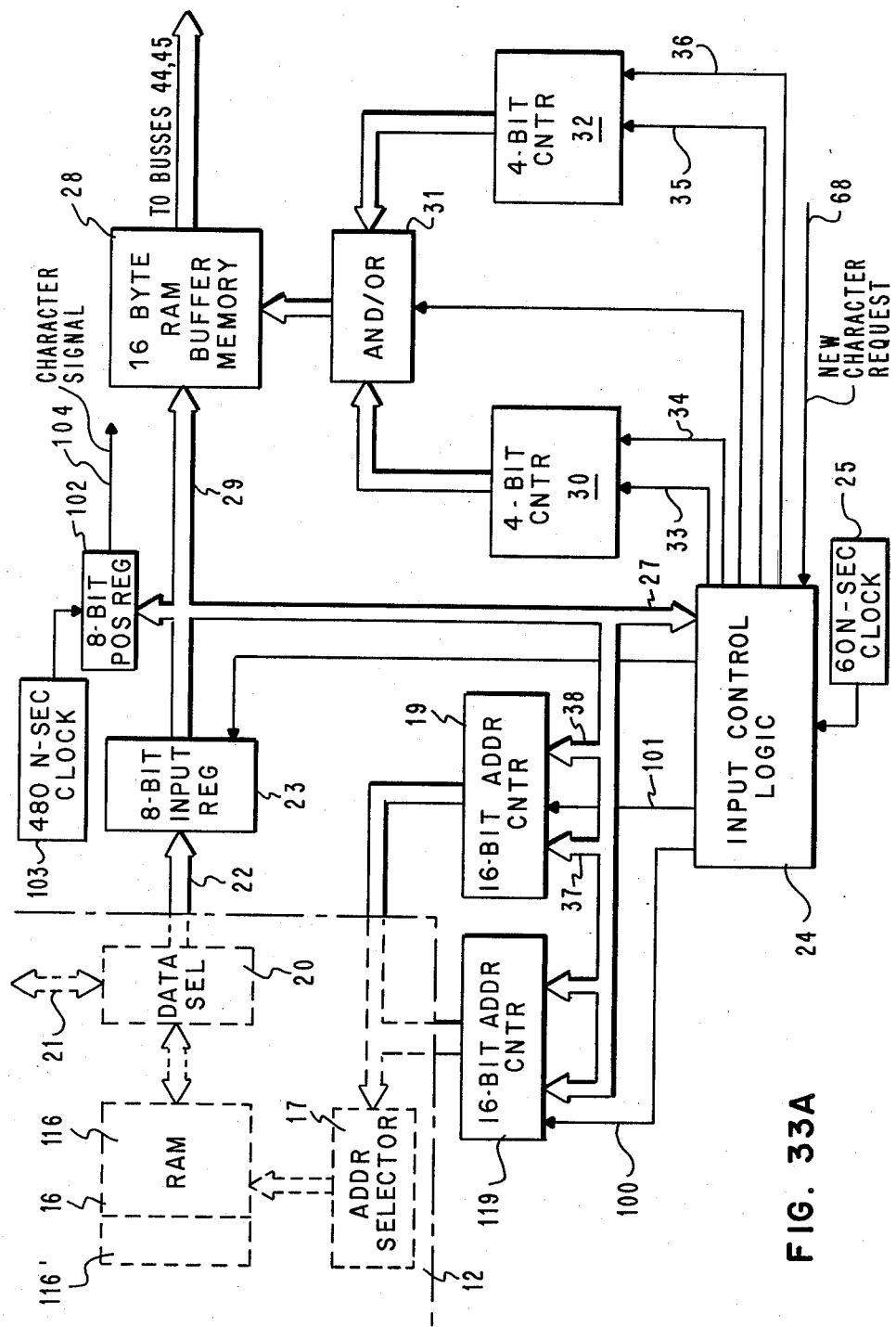
FIGS. 33A and 33B are logic diagrams showing the control logic for a CRT micro-scan display which may be used in the implementation of that embodiment of the present invention in which both the character positional information as well as the information necessary to generate characters are stored in a unitary sequential memory.
Figure 33B:
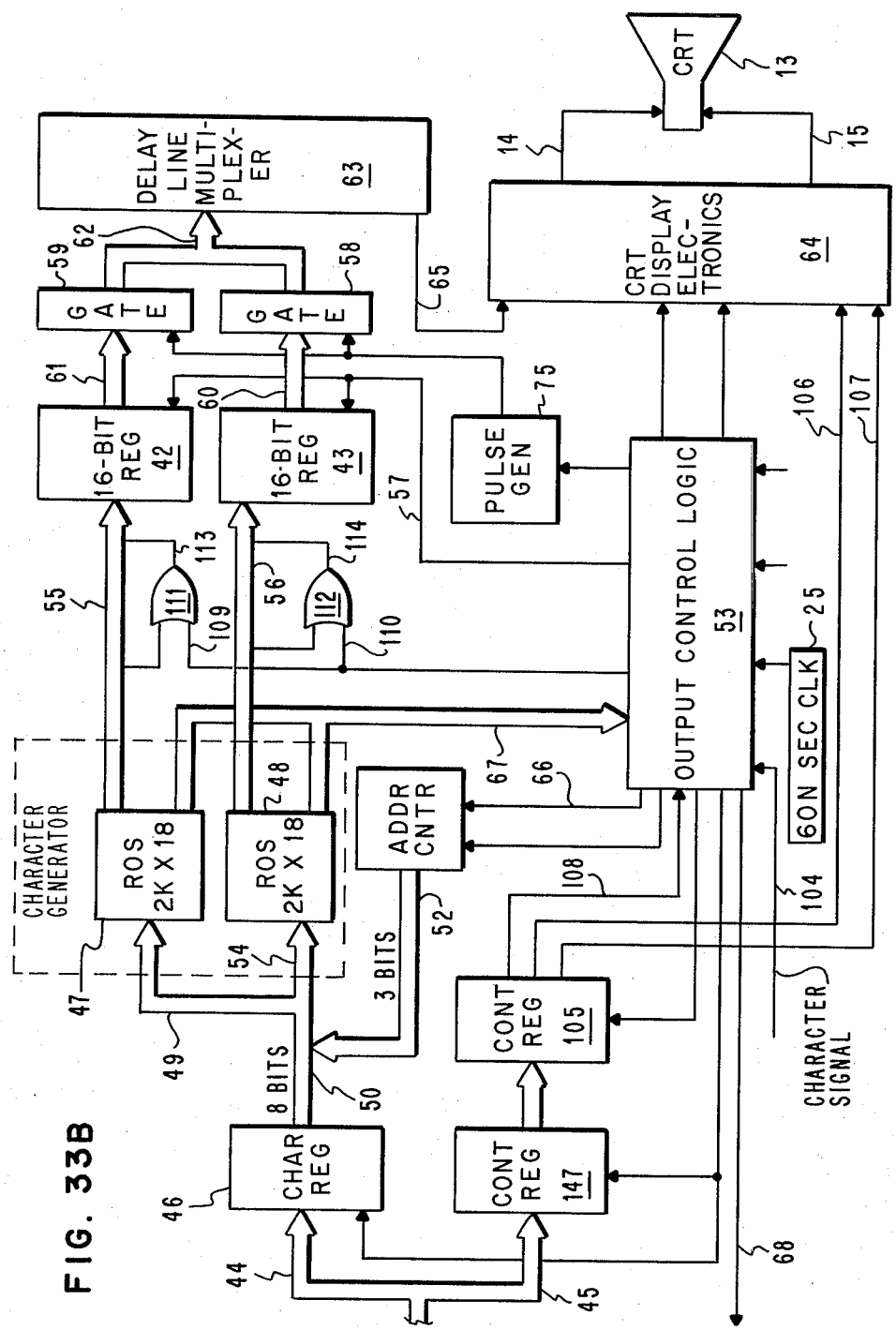

FIGS. 33A and 33B represent a modification of the control logic of FIGS. 34A and 34B in order to spatially position the displayed characters using the two coacting storage means instead of a single storage means. Because of the identity of most of the functions of the control logic set forth in FIGS. 33A and 33B with those previously described with respect to FIGS. 34A and 34B, the same numerals will be used in FIGS. 33A and 33B to designate the functional units which remain unchanged, and the operation of these will not be again described in detail. The present description will be concerned primarily with the additional or modified functional units. In FIG. 33A, a portion 116 of RAM 16 contains a stored positional matrix of the type illustrated in FIG. 2. Another portion 116' of RAM 16 contains a character code data as shown in FIG. 3 in sequential order without any positional information. With reference to FIGS. 33A and 33B, let us consider how the positions in which the character and character control data stored sequentially in section 116' of the RAM 16 are displayed by the character generation system in FIG. 33B in the proper spatial position. In order to address RAM 16, there is an additional address counter 119 which like address counter 19 is under the control of input control logic 24 which through enabling lines 100 and 101, respectively, may activate either address counter 119 which addresses bytes of data in positional memory 116 or address counter 19 which in the manner previously described with respect to FIGS. 34A and 34B addresses the character and character code data sequentially stored in memory section 116'. Irrespective of the address counter selected, the appropriate section of RAM 16 is addressed in the manner previously described (FIG. 34A) through address selector 17 and the data output from RAM 16 is output through data select 20 to input register 23 as previously described.

With a selected appropriate programming sequence, input control logic 24 has the capability of enabling address counter 19 through line 101 to address control and character data section 116' and to thereby load the 16 byte buffer memory 28 with a sequence of control code and character code data as previously described. This data stands ready to be applied to the character generator and then to the scan line registers 42 and 43 under the control of output control logic 53 in the manner previously described with respect to FIG. 34B. However, in the embodiment of FIG. 33A and 33B, the position at which each sequential character is to be displayed is determined by the input control logic 24 enabling address counter 119 through enabling line 100 to address additional matrix 116. Input logic control 24 directs positional data output from positional matrix 116 through input register 23 to positional register 102. In this addressing sequence, the next byte of positional data from the positional matrix 116 (as illustrated in FIG. 2) has been transferred to position register 102. Then, 480 nano-second clock 103 (the escapement speed) counts down the eight bits of data loaded in positional register 102 (each representing a character position) until a "1" bit is reached which determines that a character is to be displayed at the character position represented by the "1" bit. Upon this occurrence, a character signal is output on line 104 to output control logic 53 (FIG. 33B). On the other hand, when the byte of data transferred from matrix 116 to register 102 is all "0's", the addressing procedure is repeated and the next sequential byte of data is transferred to positional register 102 from positional matrix 116, and the clocking sequence repeated until a "1" bit produces a signal on line 104 until a signal is received on line 104. Output control logic 53 will inhibit the regular pulsing of pulse generator 75 (the operation of which has been previously described with respect to FIG. 34B); consequently no gating pulses will be applied to either gate 58 or 59, respectively, associated with scan registers 43 and 42; thus, the scan lines will remain blank and no characters will be displayed at the particular character position represented by the "0's" in the byte of data from positional matrix 116. When a "1" bit in the positional matrix in position register 102 finally produces a character signal on line 104, output control logic 53 will activate pulse generator 75 which in turn will activate gates 58 and 59 to permit the next character stored in ROS 47 and ROS 48 of the character generator to be "painted" or displayed on CRT 13 in the position represented by the "1" in the byte of data from positional matrix 116 on CRT display 13 in the manner previously described with respect to FIG. 34B.

From the above descriptions of the system of FIG. 34A, B as compared to that of FIG. 33A–B, it will be noted that with respect to the spatial positioning of the generated character, the combination of positional register 102 and clock 103 in FIG. 33A–B processes spatial data from matrix 116 in a manner similar to counter 69 and clock 72 of FIG. 34A, B processing the spatial data stored together with character and control code data in the system.

Logic for Control Code Processing

With respect to FIGS. 34A, B, let us now consider how the present system handles a control code designation associated with a particular character. While this illustration will deal with the embodiment of FIGS. 34A and 34B, the hardware involved in this function is substantially identical in the system of FIGS. 33A and B. As previously mentioned, when there is no control information associated with a particular character, i.e., no underscore or half indexing, etc., when the particular character code designation is stored in character register 46, a blank control code will accompany the character and be stored in register 147 but have no effect. On the other hand, when there is a definitive control code associated with the character, that control code will be stored in register 147. For example, let us assume that the control code is the BUS (begin underscore) as shown before the letter "I" in FIG. 11, this function will be loaded into display control register 105 from control register 47. With such a control code in display control register 105, during the subsequent displaying of the characters "I" and "S" (FIG. 11), control register 105 will provide a signal on line 108 to output control logic 53 which will provide underscore signals along lines 109 and 110, respectively, to gates 111 and 112 to activate these gates to provide an underscore signal along lines 113 and 114, respectively, to scan line registers 42 and 43 along with the scan line patterns provided these registers on busses 55 and 56 whereby a portion of the underscore pattern will be at the bottom of each scan line pattern to produce the underscore under "IS" as shown in FIG. 8. Then, the end underscore (EUS) which follows the letter "S", FIG. 11, will cause control register 105 to turn off the underscore on line 106.

When the control codes half-index and reverse half-index accompany a particular character, the control register 105 controls the CRT display electronics 64 by signals on lines 106 and 107 to respectively half-index and reverse half-index the displayed character.

Display of Proportionally Spaced Alphanumeric Characters

Figure 12:
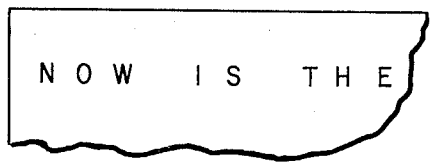
FIGS. 12-14 are diagrammatic illustrations respectively corresponding to the diagrammatic illustrations of FIGS. 1-3 except that the alphanumeric display of FIG. 1 is proportionally spaced and consequently the positional matrix of FIG. 13 is arranged in accordance with escapement rather than character position.
Figure 13:
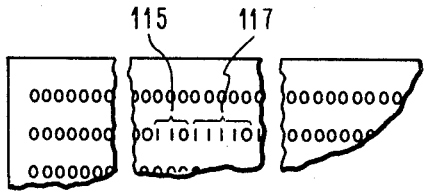
Figure 14:
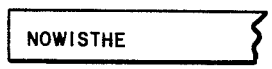

With reference to FIGS. 12, 13 and 14, the display of proportionally spaced alphanumeric characters will be described. By way of illustration, FIG. 12 shows part of the CRT on which part of a page proportionally spaced alphanumeric data is displayed. By proportionally spaced data, we mean that the data is uniformally spaced irrespective of the width of the character. To achieve this, the character boxes, i.e., the escapement width dedicated to the particular character at the particular display position must be of varying width. In the previously described display operations the character boxes at each display position were five escapement units of 480 nano-seconds each in width; with proportional spacing, the width of the character boxes may be anywhere from three to seven of such 480 nano-second escapement units. Thus, when using a positional matrix to store the spatial arrangement of the characters, a matrix as illustrated in FIG. 13 must be used wherein instead of having a single bit position represent a whole character position, each escapement unit is represented by a bit. Where there are no characters, we will merely have a string of zeros until the next escapement position wherein the presence of a "1" indicates the beginning of a character. With such an arrangement, each space may be represented by a string of five zeros representing five escapement units while the character box dedicated to narrow characters may comprise three escapement units: two one bits followed by a zero bit as for example the three bits, 115 FIG. 13 which represents the position of a narrow character "I" in the display of FIG. 12 or the four one bits followed by a zero, designated 117 in the positional matrix FIG. 13 which designates the position of the character "S" in the display FIG. 12. In this arrangement, the character like "W" would be represented by seven escapement units: six ones and the zero bit; the latter bit serves as a delimiter so that the characters may be resolved.

With such proportionally spaced characters of varying size, the display controlled logic previously described with respect to FIGS. 33A and B operates essentially in the manner described with the exception of course that the character signal on line 104 from position register 102 into output control logic 53 represents that a portion of a character is to be displayed at that respective escapement position. Thus, for example, with a character having a character box of six escapement positions, a string of five ones would be input to control logic 53 through signal line 104 while a narrow character occupying only three escapement positions would result in a string of two ones being input through line 104 to control logic 53. So long as the string of ones for the particular character is applied to control logic 53, post generator will be active to provide the previously described signals enabling gates 58 and 59 to transmit the scan line patterns from scan line registers 43 and 42. In order to maintain synchronization between the escapement position and the character being displayed, the character generator, i.e., ROS 47 and 48 will produce the character pattern in a lesser number of scan lines for a narrow character and a greater number of scan lines for a wide character.

In embodiments wherein the spatial or positional data is stored in combination with the character data as in the storage means for the system set forth in FIGS. 34A and 34B, the operation is even more straight forward. Four spaces between characters, space counter 69 merely counts the number of escapement positions between the last displayed character and the next character to be displayed at which point a signal is given over line 73 to output control logic 51 to activate both generator 75 and permit the character as defined in ROS 47 and ROS 48 of the character generator to be displayed in a selected number of scan lines dependent of course on character width.

Figure 15:
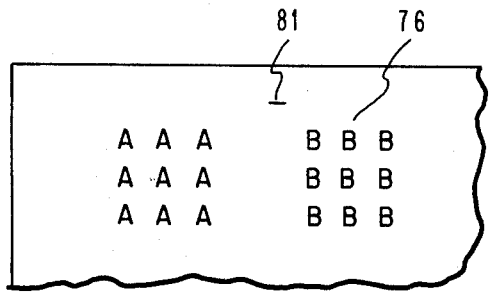
FIG. 15 is a diagrammatic illustration of alphanumeric information on a CRT display during an initial stage in a text processing operation wherein the format of a column is to be changed.
Figure 16:
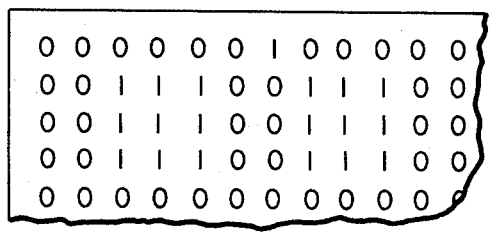
FIG. 16 is a diagrammatic illustration of matrix storage means associated with a CRT storing positional data corresponding to the position of the displayed alphanumeric character of FIG. 15.
Figure 17:
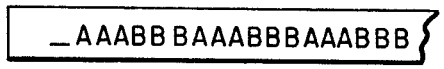
FIG. 17 is a diagrammatic illustration of the sequentially accessible storage means associated with the matrix storage means of FIG. 16 for storing coded data representations of the displayed characters in sequence at said initial stage.

Procedure for Defining and Altering the Format of a Portion or Segment of a Displayed Page of Alphanumeric Characters For purposes of illustration, let us assume that FIG. 15 shows a CRT display in which a block of alphanumeric data is displayed in two columns. The cursor in FIG. 15 is indicated by the dash. For this arrangement the memory organization comprises two coacting units each respectively shown in FIGS. 16 and 17. The matrix in FIG. 16 shows the position of the alphanumeric characters displayed in FIG. 15 while FIG. 17 illustrates the sequentially accessible memory containing the characters in sequence. It should be noted that in the present illustrative system where the cursor is not under any particular character as is the case in the display FIG. 15, cursor will have its position designated by a one bit in the matrix memory, FIG. 16 and will be stored as a discrete character in the sequentially accessible memory of FIG. 17.

Figure 18:
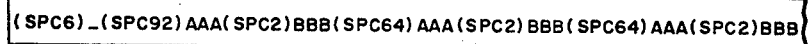

FIG. 18 illustrates the generalized single storage organization in which both the spatial and character data of the separate storage means of FIGS. 16 and 17 are stored in a single storage means, i.e., the alphanumeric data displayed in FIG. 15 shown stored in the sequential storage means of FIG. 18.

In illustrating the procedure for defining and altering the format of a portion or segment of the displayed page, we will first with respect to FIGS. 15-17, 19-21, 23-25 and 27-29 illustrate the procedure utilizing the memory storage organization like that shown in FIG. 16 and 17 wherein the character data and character code data is stored in a separate sequential storage means, FIG. 17, and the positional and spatial information is stored in a binary matrix storage, FIG. 16. Then, subsequently as a secondary illustration of the procedure we will briefly show how it may be implemented using the single storage means set forth in FIGS. 18, 22, 26, and 30.

First then, with respect to FIGS. 15-17, let us assume that we wish to define all of the data in column 76 in FIG. 15. Through appropriate key entry means in the text processing apparatus of which microprocessor 12, FIG. 33, is a part, segment defining initial bracket 77 and segment defining final bracket 78 are introduced into the CRT display, FIG. 19. This is accomplished by storing binary "1" bits 79 and 80 into the positional matrix storing means, FIG. 20 as well as initial bracket representation 77' and final bracket representation 78' into the sequential storage means shown in FIG. 21. It should be noted with respect to FIG. 20 that since the cursor line 81 in the CRT is under the final bracket representation, i.e., "1" bit 80 in matrix FIG. 21 represents the position of both the final bracket and cursor, then the cursor is no longer stored as a discrete character in sequential memory FIG. 21 but rather as the character code designation "CUR". With initial and final brackets 77 and 78 positioned as shown in FIG. 19, microprocessor 12, FIG. 33A, has the logical capability of defining the alphanumeric data segment 82 in the CRT of FIG. 19 as defined by the phantom lines and also defined by the phantom lines in positional matrix FIG. 20. When thus defined, the microprocessor logic may now treat the outline of the defined segment in much the same manner as the margins of a page during such reformatting text processing operations as justifying, adjusting, column keying, column moving, and column margin definition.

Figure 24:
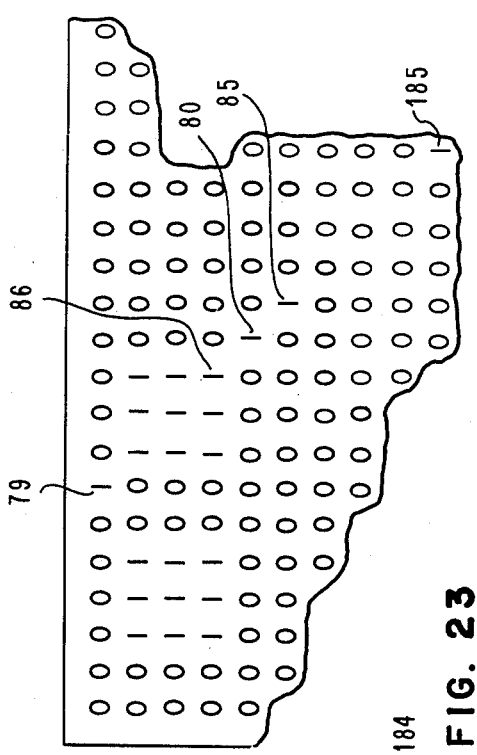
FIG. 24 is a diagrammatic illustration of matrix storage means associated with a CRT storing positional data corresponding to the position of the displayed alphanumeric character of FIG. 23.
Figure 23:
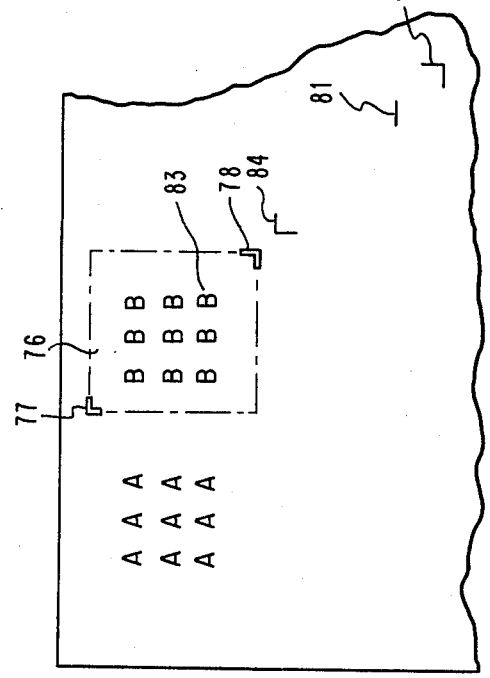
FIG. 23 is a diagrammatic illustration of alphanumeric information on a CRT display during a third stage in a text processing operation wherein the format of a column is to be changed.
Figure 25:
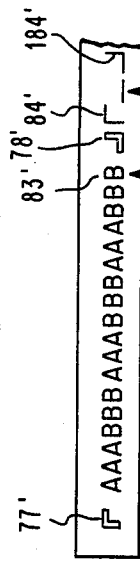
FIG. 25 is a diagrammatic illustration of the sequentially accessible storage means associated with the matrix storage means of FIG. 24 for storing coded data representations of the displayed characters in sequence at said third stage.
Figure 26:
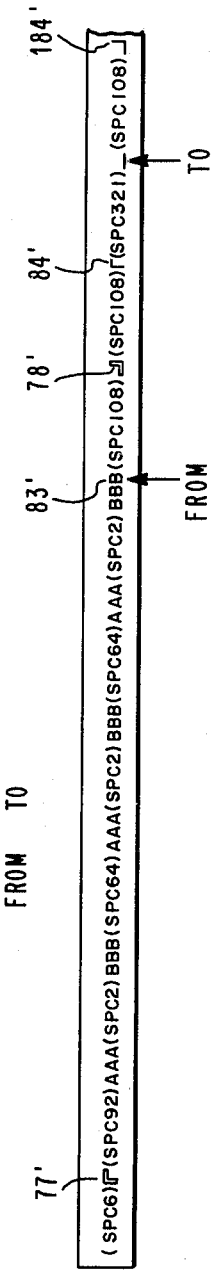

To illustrate a simple column movement with respect to FIGS. 23-25, assume that column 76 is to be moved so that the character "B" 83, FIG. 23, is to be moved to the position indicated by cursor 81 in FIG. 23 and that the remainder of column 76 is to be moved so that it occupies equivalent positions with respect to the character "B" 83. First, the operator will define the move-to block by moving the cursor to the position of the initial move-to bracket 84 and keying in this bracket followed by moving the cursor to the position of final move-to bracket 184 and keying in this bracket. This keying will result in the microprocessor logic inserting "1" bits 85 and 185, respectively in the positional matrix of FIG. 24 at the positions of the respective initial move-to and final move-to brackets; the microprocessor will also insert representations 84' and 184' respectively of the initial and final move-to bracket in the sequential storage means, FIG. 25, at the sequential positions to be occupied by the representation of these move-to brackets.

Having thus defined the move-to positions of the column, the first character in the column to be moved, "B" 83 is moved by first moving the cursor 81 in FIG. 23 to a position under the character "B" 83 and keying in a "move-from" command. As a result of this keying, the microprocessor will insert a From Pointer at the representation 83' of the character "B" in the sequential storage shown in FIG. 25. The cursor is then moved to the position shown in FIG. 23 which is the position to which character "B" 83 is to be moved, and the operator keys in a "move-to" command which results in a To Pointer pointing to the sequential position which representation 83' of the character "B" is to occupy upon the completion of the move.

Figure 28:
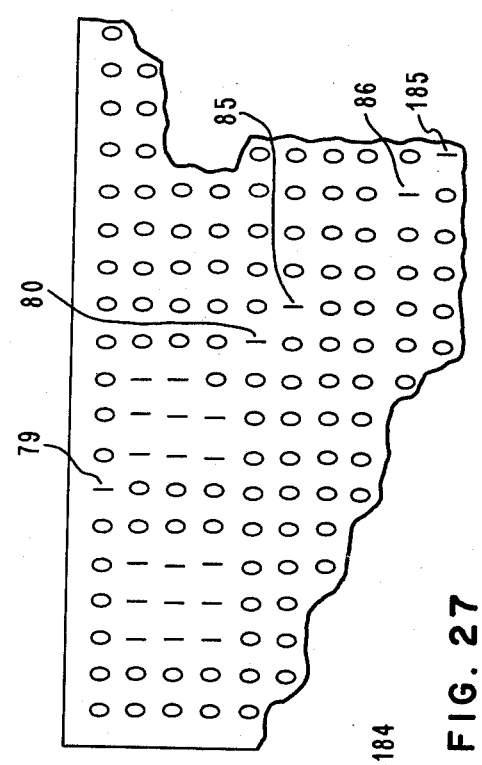
FIG. 28 is a diagrammatic illustration of matrix storage means associated with a CRT storing positional data corresponding to the position of the displayed alphanumeric character of FIG. 27.
Figure 27:
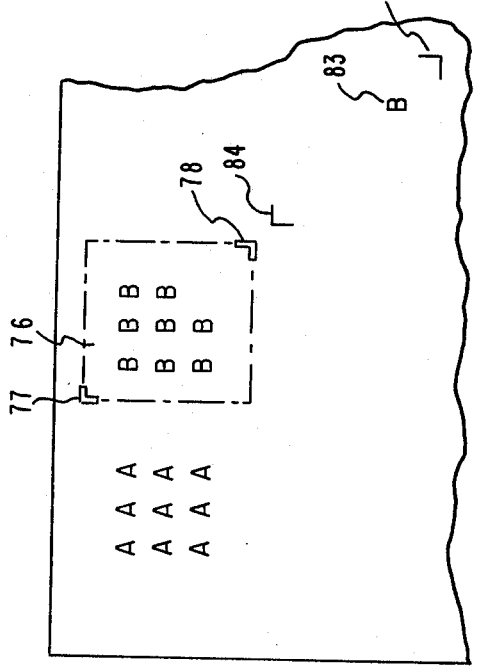
FIG. 27 is a diagrammatic illustration of alphanumeric information on a CRT display during a fourth stage in a text processing operation wherein the format of a column is to be changed.
Figure 29:
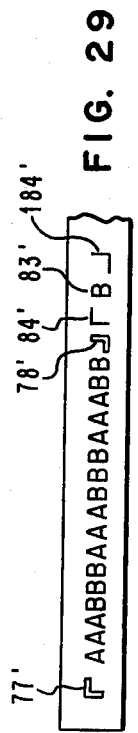
FIG. 29 is a diagrammatic illustration of the sequentially accessible storage means associated with the matrix storage means of FIG. 28 for storing coded data representations of the displayed characters in sequence at said fourth stage.
Figure 30:
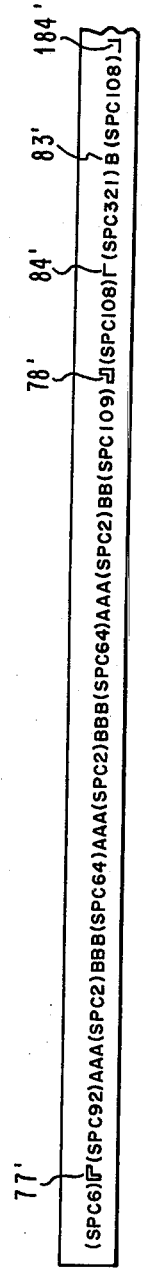

At this point the operator gives the "move" command, in response to which the microprocessor which controls the operation sets up the change as shown in FIG. 27-29. The "1" bit 86 which represents the position of the character "B" 83 in the positional matrix is removed from its initial position in the matrix of FIG. 24 to its final position as shown in the matrix of FIG. 28. The representation 83' of the character "B" in the sequential storage means is removed from the initial position that it occupied in the sequential storage means of FIG. 25 and moved to the position which is shown as occupying in the sequential storage means of FIG. 29. As a result, the combination of the positional storage matrix of FIG. 28 together with the sequential storage means of FIG. 29 will provide the moved-to arrangement displayed in the CRT of FIG. 27.

Upon the completion of this initial move, the next "B" from column 76 will be moved in the same manner until the entire column is moved, at which time, brackets 77, 78 and 84 and 184 will be removed from the display and another operation commenced.

The sequence of processing steps involved in the definition of a segment on the CRT and the reformatting of a portion of said segment which has been described with respect to FIGS. 15-17, 19-21, 23-25 and 27-29 utilizing a storage means in which positional and character information are stored separately may be implemented utilizing a unitary storage means wherein spatial information as well as the coded data representations for the characters are stored in a single sequentially accessible storage means. In FIGS. 18, 22, 26 and 30, the above sequence of steps involved in the reformatting of the display of FIGS. 15 to that of FIG. 27 is shown by illustrating the changes which are effected in an illustrative single storage means in order to respectively implement the progression of changes in the CRT. The sequence of changes should be apparent from the arrangement in the storage means of FIGS. 18, 22, 26 and 30 which are of course similar in organization to storage means previously described with respect to FIG. 4.

While the invention has been particularly shown and described with reference to a particular embodiment, it will be understood by those skilled in the art that various changes in form and detail may be made without departing from the spirit and scope of the invention.

What is claimed is:

1. A text processing and display system comprising:
   a display device for simultaneously displaying a plurality of lines of alphanumeric characters,
   matrix storage means for storing data representative of the positions of the displayed characters in successive lines of ordered storage locations spatially corresponding to the positions of said characters in said display,
   means for sequentially storing the coded data representations of said displayed characters in the same sequence as said ordered storage locations of said position representative data for said respective characters in said matrix storage means,
   repetitive display scanning means for traversing ordered character display positions in successive lines on said display device,
   means for scanning the ordered storage locations in said matrix storage means in synchronization with said display scanning,
   means for accessing the data representations for characters being displayed when said matrix scanning means senses a stored character position, and
   means for applying signals representative of said character data being displayed to said display device in response to said accessed character representation.

2. The text processing and display system of claim 1 wherein said display device is a cathode ray tube display and said display scanning means are raster scanning means.

3. The text processing and display system of claim 1 wherein coded data representative of an attribute of at least one next successive character is stored in said sequential storage means immediately preceding said character data and accessed when said character data is accessed, and
   said means for applying signals representing said character, further apply associated signals representative of said attribute to said display device.

4. The text processing and display system of claim 3 wherein the coded data is representative of an attribute of a plurality of next successive characters, and
   further including coded data representative of the termination of said attribute immediately succeeding the coded data representative of the last of said plurality of characters.

5. The text processing and display system of claim 1 wherein said displayed alphanumeric characters are arranged in said ordered locations with variable spacing there between dependent upon varying character widths.

6. The text processing and display system of claim 1 wherein said matrix storage means is a two-dimension matrix of binary units, each unit being in a binary state representative of the presence or absence of a character at its corresponding position in said display.

7. The text processing and display system of claim 5 wherein said matrix storage means is a two-dimensional matrix of binary units arranged in said lines and each of said storage locations has a variable number of said binary units dependent upon the width of the corresponding displayed character.

8. The text processing and display system of claim 1 further including means for defining spatial limits for a block of stored data corresponding to the spatial limits of a block of alphanumeric characters in said display comprising:
   means for inserting data designating the position of the initial alphanumeric character in said block into a storage location in said matrix corresponding to the display position of said initial character,
   means for inserting coded data designating said initial character in said block into said sequential storage means immediately preceding the coded data representation of said character,
   means for inserting data designating the position of the final alphanumeric character in said block into a storage location in said matrix corresponding to the display position of said final character, and
   means for inserting coded data designating said final character in said block into said sequential storage means immediately succeeding the coded data representative of said character.

9. The text processing and display system of claim 8 further including means for changing the spatial arrangement of said displayed block of characters by changing the spatial arrangement of character position data in said matrix between the data designating said initial and said final positions.

10. The text processing and display system of claim 9 wherein said means for changing the spatial arrangement include means for changing the spatial arrangement of said block of character position data into column.

11. A text processing and display system comprising:
    a display device for simultaneously displaying a block comprising a plurality of lines of alphanumeric characters in ordered display positions,
    means for sequentially storing coded data representations of said displayed characters in a sequence of storage positions spatially corresponding to the positions of said characters in said displayed block,
    repetitive display scanning means for traversing said ordered character display positions in successive lines on said display device,
    means for sequentially accessing the data representations for each character to be displayed from said storage means in synchronization with said display scanning means,
    means for applying to said display device signals representative of the whole character to be displayed at a display position prior to the movement of said display scanning means to the next display position whereby each whole character in said displayed block is refreshed before the next character is refreshed, and
    means for defining spatial limits for a section of said stored data representations corresponding to selected spatial limits for a section of alphanumeric characters in said displayed block comprising:
    means for inserting coded data designating the initial alphanumeric character in said selected section into said sequential storage means immediately preceding the coded data representation of said character, and
    means for inserting coded data designating the final alphanumeric character in said selected section into said sequential storage means immediately succeeding the coded data representation of said character.

12. The text processing and display system of claim 11 further including means for changing the spatial arrangement of said displayed section of characters by changing the spatial arrangement of the coded data representations of said characters in said sequential storage means between the data designating said initial and said final positions.

13. The text processing system of claim 12 wherein said means for changing the spatial arrangement include means for changing the spatial arrangement of said selected displayed section into column by changing the spatial arrangement of said sequential coded data representations to provide such a displayed column.

* * * * *